June 1, 1937.   J. G. HODGE   2,082,056
TWO-PIECE PISTON RING
Filed Jan. 27, 1936
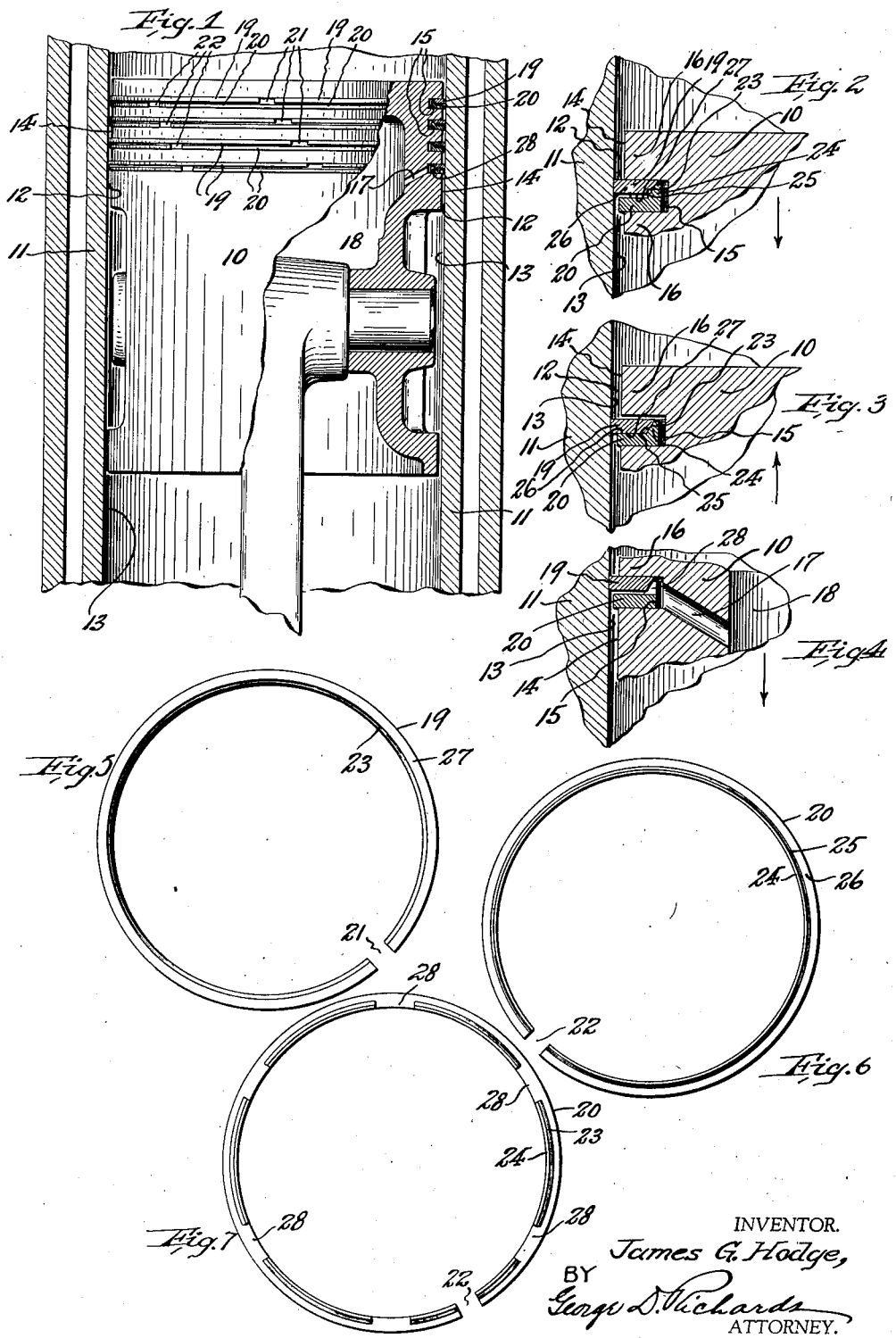
INVENTOR.
James G. Hodge,
BY George D. Richards
ATTORNEY.

Patented June 1, 1937

2,082,056

UNITED STATES PATENT OFFICE 2,082,056

TWO-PIECE PISTON RING

James G. Hodge, East Orange, N. J., assignor to Clipper Piston Ring Corporation, New York, N. Y., a corporation of New York Application January 27, 1936, Serial No. 60,946

6 Claims. (Cl. 309—32)

This invention relates to improvements in piston rings such as employed principally in internal combustion engines; and the invention has reference, more particularly, to an improved construction of a two-piece piston ring adapted to efficiently provide for both axial and radial expansion effects without necessity for use of auxiliary expanders, and which, by reason of the novel construction and mutual cooperation of the ring elements, avoids all tendency to jam either in the ring seating grooves of the piston or in the clearance space between the piston and cylinder wall surfaces.

In many types of multiple-piece piston rings as heretofore proposed and designed to provide for both axial and radial expansion, the ring elements have been furnished with mutually cooperative conical surfaces coextensive with the full or substantially the full radial width of the ring elements, thereby extending the angular margins thereof through the clearance space between the piston and cylinder wall surfaces and into contact with the latter. Such and similar types of construction have been found objectionable in practice for the reason that jamming or wedging action of the angular conical portions projecting into said clearance space frequently occurs during piston movements, thereby setting up a strong frictional drag with consequent resistance to free piston movement, and not infrequently forcing an angular edge portion over the lip or margin of the piston ring groove land with such strong wedging effect as to actually "freeze" the piston in the cylinder, and, in any event, causing excessive wear on the piston ring elements, cylinder wall and piston ring groove lands which soon greatly diminishes the efficiency and sealing function of the piston ring arrangement.

Having the above and other objections in mind, it is the principal object of my present invention to provide a novel construction of piston ring comprising two cooperative elements having a novel disposition, form and arrangement of mutually cooperative conical surfaces or portions calculated to produce the desired axial and radial expansion effects; said conical surfaces or portions being disposed and retained well within the confines of the piston ring groove, and the ring elements being further provided with cooperative meeting surfaces of comparatively large area in planes parallel to the horizontal plane of the ring structure, said surfaces extending outwardly from said conical surfaces or portions to the outer peripheries of the ring elements, and said surfaces acting as stops against any tipping, turning or deformation of the ring elements, especially with respect to the portions thereof which project into the clearance space between the piston and cylinder walls, and consequently not only avoiding all tendency to jamming or wedging action with resultant piston drag, but, on the contrary, assuring the desired true following tensional contact of the ring with the cylinder wall, and thereby obtaining efficient sealing effect with minimum wear.

Another object of this invention is to provide a two-piece piston ring structure capable of axial and radial expansion without necessity for using auxiliary expanders, and wherein the axial expansion is adequate to expand the ring structure within the piston ring groove and against the lands thereof with sufficient pressure to hold the piston centered in the cylinder and the rings against slap, while at the same time, radial expansion is also effected, sufficient to assure a tight seal against loss of compression in the cylinder firing chamber and to prevent leaking of oil into the latter.

Other objects of this invention, not at this time more particularly enumerated, will be understood from the following detailed description of the same.

An illustrative embodiment of this invention is shown in the accompanying drawing, in which:

Fig. 1 is a fragmentary vertical sectional view of a cylinder and piston, the latter being shown in part elevation and in part vertical section, and said piston being equipped with piston rings made according to this invention.

Fig. 2 is a fragmentary vertical sectional view of a cylinder and piston equipped with the novel piston ring structure according to this invention, and illustrating the disposition of the rings during a downward movement of the piston; Fig. 3 is a similar view showing the disposition of the rings during an upward movement of the piston; and Fig. 4 is another similar view showing the piston ring structure as modified and arranged for service as a ventilated or oil ring.

Fig. 5 is an under face view of the top ring element of the two-piece piston ring structure according to this invention; Fig. 6 is a top face view of the bottom ring element of said two-piece piston ring structure; and Fig. 7 is a top face view of the bottom ring element as modified to serve with the top ring element in providing a ventilated or oil control ring structure.

Similar characters of reference are employed in the above described views, to indicate corresponding parts.

Referring to the drawing, reference character 10 indicates a piston reciprocable in a cylinder 11, a clearance space 12 being allowed between the internal wall surface 13 of said cylinder and the external wall surface 14 of said piston. The piston 10 is provided with a plurality of suitably located annular piston ring grooves 15 bounded by lands 16. The upper grooves are adapted to receive the novel piston ring structures as adapted to provide compression rings, while the lowermost groove is adapted to receive a ring structure adapted to serve as a ventilated or oil control ring; oil return passages 17 extending from the bottom of said latter groove through the piston wall so as to communicate with the hollow, open bottom interior 18 of said piston, for return of oil to the engine crank case.

The novel piston ring structure according to this invention, as formed to provide a ring for compression sealing purposes, comprises two superimposed ring elements, viz. an upper ring element 19 and a lower ring element 20; each being of suitable thickness, somewhat less than one-half the width of the piston ring groove 15 in which the complete ring structure is to be mounted, and of a radial width suitably accommodated to the depth of said groove 15, so as to allow sufficient play for the radial expansion effects thereof in operation. Said upper and lower ring elements 19 and 20 are initially, i. e. before being operatively joined in mutual assembled relation, of substantially the same diameter. The upper ring element is provided with a gap or break 21 of suitable dimension, which is usually of a standard width for all ring sizes, and, likewise, the lower ring element is also provided with a gap or break 22, usually of approximately one-quarter of an inch in width in the small ring sizes but proportionately increased in the larger ring sizes. The lower ring element is possessed of substantial tension when spread, but the upper ring section may be made to possess a like inherent tension or with substantially no tension, in the latter case providing what is known to the art as a flexible or "dead" ring. Along the inside circumference of upper ring element 19 is formed an inwardly facing female conical surface 23, extending from the margin of its upper face to its lower face. Integral with the lower ring element 20, to project upwardly from its upper face coincidentally with its inside circumference, is an annular rib 24. Said rib 24 is provided with an outwardly facing male conical surface 25 extending from the top of said rib 24 to the plane of the upper surface of said lower ring element 20.

When the two ring elements 19 and 20 are superimposed and inserted in a piston ring groove 15, the female conical surface 23 of upper ring element slidingly engages with the male conical surface 25 of lower ring element. When the piston is entered within the cylinder, the outer peripheral circumference of upper ring element 19, by engagement with the cylinder wall surface 13, places the upper ring element under tension by radial compression or contraction, and contraction of the upper ring element by its engagement with lower ring element likewise places the latter under tensional radial compression or contraction. The radial tension of the two ring elements, under such conditions, tends to force the respective conical surface portions thereof into mutual engagement, thereby resolving, through the induced movement of the inclined meeting planes of such conical surfaces, a portion of the force of said radial tension into an axially directed pressure resulting in a tendency of the ring elements to move axially apart, thus effecting an axial expansion of the ring structure as a whole. Such axial expansion of the ring structure causes upper ring element 19 to strongly abut the under surface of upper bordering land 16 of the piston ring groove 15, while lower ring element 20 is caused to strongly abut the upper surface of the lower bordering land of said groove, thus filling the groove and producing a sufficiently strong groove land pressure to assure the holding of the piston centered in the cylinder bore (see Fig. 2). Since the lower ring section 20 when radially contracted is smaller in external diameter than is upper ring element 19, and since upper ring element alone contacts with the cylinder wall surface 13, said upper ring element, on down stroke of piston, tends to wipe lubricating oil from the cylinder wall surface and carry the same into the space between the ring elements when under axial expansion (see Fig. 2), thereby keeping the cooperating conical surfaces of said ring elements sufficiently lubricated to assure that rapid and sensitive response and interaction in operation which is best calculated to cause the ring to hug the cylinder wall, and to follow the tapered or otherwise distorted surfaces of said walls in the event the latter are worn.

It will be observed that the cooperative male and female conical surfaces of the ring elements are disposed substantially at the inner circumferences of the latter, and consequently are kept at all times well within the interior and adjacent to the bottom or back of piston ring groove 15, with the major portions of the flat surfaced bodies of said ring elements alone extending forwardly toward and through the mouth of said piston ring groove. By this arrangement, the lower ring element is provided with a considerable area of flat horizontal surface 26, and upper ring element with a like area of flat horizontal surface 27, the major portions of which surfaces are opposed to each other at points extending inwardly of the open mouth of piston ring groove 15. As a consequence of this, when upper ring element 19 tends to move axially toward lower ring element 20, as occurs upon upward movement of the piston (see Fig. 3), a meeting of these opposed surfaces 26—27 definitely limits or stops any abnormal displacement of the ring elements and prevents all tendency thereof to wedge or jam, either within the groove interior or in the clearance space between piston and cylinder wall. The tendency of upper ring element 19 to move toward lower ring element 20 on upward movement of piston operates, through the coacting conical surfaces 23—25, to further contract lower ring element 20 and thereby to increase the tensional radial thrust thereof upon the upper ring element 19, so that the outer perpendicular periphery of the latter is caused to squarely and firmly hug the cylinder wall with maximum compression sealing effect during such upward piston movement.

I have found it of advantage to provide the conical surfaces 23—25 of small angular pitch or inclination, preferably of about twenty to thirty degrees more or less divergent from the perpendicular. By so doing, the movement of these surfaces in relation one to the other operates to effect a more satisfactory degree of axial expansion or movement of the ring elements toward and from each other, while at the same time assuring a somewhat more sensitive radial expansion and contraction, which factors, taken with the location of the conical surfaces wholly within the interior of piston ring groove, provide adequate assurance against any undesirable wedging or jamming action.

The radial contraction effected by compression of lower ring element 20 induces a flexible tension in or radial thrust upon the upper ring element, which assures firm and yet smooth engagement of the latter with the cylinder wall, without requiring the auxiliary aid of additional expander devices in association with the ring structure per se. The sensitive responsiveness of the ring structure, as above pointed out, also permits its use in comparatively thin sizes and make up, and the efficient functioning thereof in high speed internal combustion engines, free from tendency to collapse.

Referring more particularly to Figs. 4 and 6 of the drawing, I have shown therein a modification of the above described two-piece piston ring structure which is calculated to adapt the same for use as an oil control ring. The only change made is the provision of oil gaps or passages 28 which are cut transversely through the rib 24 of lower ring element 20, so that when the latter is assembled with upper ring element 19, and the combined ring structure mounted in a proper groove of the piston, oil may pass the ring structure to escape through passage 17 and open hollow interior of piston back to engine crank casing. By reference to Fig. 4, it will be observed that, on downward movement of piston 10, the outer periphery of upper ring element 19 will wipe oil from the cylinder wall surface 13, the oil thereupon passing between piston ring elements 19 and 20, and through said passages 28 into rear of piston ring groove 15, to flow thence through said escape passage 17.

From the above description it will be obvious that this invention provides a very simple and yet highly efficient two-piece piston ring capable in operation of a quickly responsive and sensitive radial and axial expansion and contraction, and yet free from tendency to any wedging or jamming action, since there are no angularly surfaced portions outwardly projected at any point from the piston ring groove or in direct contact with the cylinder wall.

Having thus described my invention, I claim:

1. A piston ring structure comprising flat upper and lower discontinuous ring elements of substantially equal initial inner and outer diametrical dimensions and each of a thickness somewhat less than one-half of the width of a piston ring groove in which the ring structure is to be mounted, said lower ring element having an annular rib upwardly projecting from its top face along its inner circumferential margin, said rib having at its outer face a male conical surface, and said upper ring element having a female conical surface along its inner circumference to extend between its top and bottom faces, said upper ring element being superposed on said lower ring element under tensional radial expansion with its female conical surface abutting said male conical surface of the latter so as to exercise a radial compressive effect thereupon and with the outer periphery of said upper ring element exteriorly overhanging the outer periphery of said lower ring element whereby cylinder wall contact is made only by said upper ring element, the tendency to radial expansion of the compressed lower ring element and radial compression of the upper ring element being operative to effect relative movement of the engaged male and female conical surfaces with consequent axial expansion of the ring structure.

2. A piston ring structure comprising flat upper and lower discontinuous ring elements of substantially equal initial inner and outer diametrical dimensions and each of a thickness somewhat less than one-half of the width of a piston ring groove in which the ring structure is to be mounted, said lower ring element having an annular rib upwardly projecting from its top face along its inner circumferential margin, said rib having at its outer face a male conical surface, and said upper ring element having a female conical surface along its inner circumference to extend between its top and bottom faces, said upper ring element being superposed on said lower ring element under tensional radial expansion with its female conical surface abutting said male conical surface of the latter so as to exercise a radial compressive effect thereupon and with the outer periphery of said upper ring element exteriorly overhanging the outer periphery of said lower ring element whereby cylinder wall contact is made only by said upper ring element, the tendency to radial expansion of the compressed lower ring element and radial compression of the upper ring element being operative to effect relative movement of the engaged male and female conical surfaces with consequent axial expansion of the ring structure, said ring elements having opposed areas of flat surfaces of substantial extent in horizontal plane and extending outwardly from their respective conical surfaces to their outer peripheries which on meeting under axial compression of the ring structure mutually brace said ring elements against distortion or other abnormal displacement with consequent risk of jamming or wedging in use.

3. A piston ring structure comprising upper and lower discontinuous ring elements in superimposed relation, said lower ring element having an annular rib upwardly projecting from its top face coincident with the inner circumference thereof, said rib having at its outer face a male conical surface, and said upper ring element having a female conical surface defining its inner periphery and cooperative with male conical surface of said lower ring element with radially compressing effect thereon, the tendency to radial expansion of the compressed lower ring element and radial compression of the upper ring element being operative to effect relative movement of the engaged male and female conical surfaces with consequent axial expansion of the ring structure and a radial outward thrust upon said upper ring so that it alone engages with cylinder wall, said ring elements having opposed areas of flat surfaces of substantial extent in horizontal plane and extending outwardly from their respective conical surfaces to their outer peripheries which on meeting under axial compression of the ring structure mutually brace said ring elements against distortion or other abnormal displacement with consequent risk of jamming or wedging in use.

4. A piston ring structure as defined in claim 3, wherein the angular inclination of the conical surfaces of said ring elements approximates from twenty to thirty degrees from the perpendicular.

5. A piston ring structure as defined in claim 4, wherein the angular inclination of the conical surfaces of said ring elements approximates from twenty to thirty degrees from the perpendicular.

6. A piston ring structure as defined in claim 5, wherein the angular inclination of the conical surfaces of said ring elements approximates from twenty to thirty degrees from the perpendicular.

JAMES G. HODGE.